US012345175B2

(12) United States Patent
Brandl et al.

(10) Patent No.: US 12,345,175 B2
(45) Date of Patent: Jul. 1, 2025

(54) TURBINE BLADE, TURBINE BLADE ASSEMBLY, AND GAS TURBINE

(71) Applicant: DOOSAN ENERBILITY CO., LTD, Changwon-si (KR)

(72) Inventors: Herbert Brandl, Baden (CH); Giwon Hong, Baden (CH)

(73) Assignee: Doosan Enerbility Co., Ltd., Changwon-si (KR)

( * ) Notice: Subject to any disclaimer, the term of this patent is extended or adjusted under 35 U.S.C. 154(b) by 0 days.

(21) Appl. No.: 18/196,898

(22) Filed: May 12, 2023

(65) Prior Publication Data

US 2024/0318560 A1 Sep. 26, 2024

(30) Foreign Application Priority Data

Mar. 23, 2023 (EP) .................................... 23163634

(51) Int. Cl.
*F01D 5/18* (2006.01)

(52) U.S. Cl.
CPC .......... *F01D 5/186* (2013.01); *F05D 2220/32* (2013.01); *F05D 2240/30* (2013.01); *F05D 2260/202* (2013.01)

(58) Field of Classification Search
CPC ........................... F01D 5/186; F05D 2260/202
See application file for complete search history.

(56) References Cited

U.S. PATENT DOCUMENTS 4,773,593 A * 9/1988 Auxier .................... F01D 5/184 239/127.3
9,376,919 B2 * 6/2016 Fujimoto ................ F01D 5/186
10,641,099 B1 * 5/2020 Waite ...................... F23R 3/002
10,669,896 B2 * 6/2020 Propheter-Hinckley ..................... F01D 5/187
2013/0108471 A1 * 5/2013 Fujimoto ................ F01D 5/182 416/97 R
2015/0226069 A1 8/2015 Pearson et al.
2016/0326886 A1 * 11/2016 Lewis ...................... F01D 25/12
2017/0306764 A1 * 10/2017 Konitzer ............... F01D 25/002
2019/0218940 A1 * 7/2019 Propheter-Hinckley ..................... F01D 5/186

(Continued)

FOREIGN PATENT DOCUMENTS

EP 2 592 228 A1 5/2013
EP 3 000 974 A1 3/2016

(Continued)

OTHER PUBLICATIONS

Extended European Search Report and Opinion received for European Patent Application No. 23163634.1, mailed on Sep. 4, 2023, 12 pages.

*Primary Examiner* — Eldon T Brockman
(74) *Attorney, Agent, or Firm* — Shook, Hardy & Bacon L.L.P.

(57) ABSTRACT

A blade for a gas turbine includes an outer surface, an inner surface that defines a cavity for receiving a gaseous cooling fluid, and a cooling hole foot formed on the inner surface. The cooling hole foot includes an first foot surface that extends inclined relative to a base surface region of the inner surface surrounding the cooling hole foot. A cooling hole extends between the first foot surface of the cooling hole foot and the outer surface to discharge cooling fluid from the cavity to the outer surface. A central axis of the cooling hole extending transverse to the first foot surface.

17 Claims, 4 Drawing Sheets

(56) References Cited

U.S. PATENT DOCUMENTS

| | | | | |
|---|---|---|---|---|
| 2020/0141271 | A1* | 5/2020 | Waite | F01D 25/12 |
| 2020/0378305 | A1* | 12/2020 | Dudebout | F23R 3/002 |
| 2021/0040859 | A1 | 2/2021 | Osgood et al. | |
| 2021/0222565 | A1* | 7/2021 | Snider | F01D 5/18 |
| 2022/0195873 | A1 | 6/2022 | Okpara et al. | |

FOREIGN PATENT DOCUMENTS

| | | | |
|---|---|---|---|
| EP | 3 054 113 | A1 | 8/2016 |
| EP | 3 091 184 | A1 | 11/2016 |
| EP | 3 854 991 | A2 | 7/2021 |

* cited by examiner

TURBINE BLADE, TURBINE BLADE ASSEMBLY, AND GAS TURBINE

CROSS-REFERENCE TO RELATED APPLICATION(S)

This application claims priority to European Patent Application No(s). 23163634.1, filed on Mar. 23, 2023, the disclosure(s) of which is(are) incorporated herein by reference in its(their) entirety.

BACKGROUND OF THE INVENTION

Field of the Invention

The present invention relates to a blade for a gas turbine, a blade assembly for a gas turbine, and to a gas turbine.

Description of the Related Art

Blades and vanes of a gas turbine, in particular, blades and vanes in a turbine part of the gas turbine, are subject to high thermal loads. Therefore, it is common to cool the blades and vanes by means of a cooling fluid, such as compressed air delivered by a compressor of the gas turbine. The cooling fluid, typically, is conducted to an interior cavity of the blade or vane and discharged to an outer surface of the blade through cooling holes extending between an inner surface that defines the interior cavity and the outer surface of the blade.

Since individual regions of the outer surface of the blade are exposed to different temperatures, the positions where the individual cooling holes open to the outer surface of the blade are distributed over the outer surface of the blade. As a consequence, at least some of the cooling holes may have a central axis that extends inclined relative to the inner surface of the blade. Hence, an aperture of the cooling hole on the inner surface may have locally very small radii. Depending on a stress field within the blade, high mechanical stress may locally occur in the region of the aperture of the cooling hole.

A turbine blade with cooling holes that extend inclined relative to an inner surface of the blade is disclosed, for example, in US 2015/0 226 069 A1.

SUMMARY

It is one of the objects of the present invention to provide improved solutions for cooling a blade of a gas turbine. In particular, it is an object to minimize local mechanical stress in the region of a cooling hole of a blade for a gas turbine.

To this end, the present invention provides a blade in accordance with claim 1, a turbine blade assembly in accordance with claim 14, and a gas turbine in accordance with claim 15.

According to a first aspect of the invention, a blade for a gas turbine includes an outer surface, an inner surface that defines a cavity for receiving a gaseous cooling fluid, and a cooling hole foot formed on the inner surface. The cooling hole foot includes a first foot surface that extends inclined relative to a base surface region of the inner surface surrounding the cooling hole foot. The blade further includes a cooling hole extending between the first foot surface of the cooling hole foot and the outer surface to discharge cooling fluid from the cavity to the outer surface. A central axis of the cooling hole extends transverse to the first foot surface.

According to a second aspect of the invention, a turbine blade assembly includes a rotor disk and a plurality of the blades according to the first aspect of the invention. The blades are coupled to the rotor disk, wherein each of the plurality of blades is coupled to the rotor disk, e.g., by means of a root.

According to a third aspect of the invention a gas turbine includes the turbine blade according to the first aspect of the invention.

It is one of the ideas of the present invention to provide a cooling hole foot on the inner surface of the blade, wherein the cooling hole foot has first surface that extends inclined relative to a region or portion of the inner surface surrounding the cooling hole foot. A cooling hole that connects the cavity defined by the inner surface and an outer surface of the blade extends from the first surface of the cooling hole foot to the outer surface with its central axis being transverse to the first surface of the cooling hole foot and, thus, inclined to the surface region of the inner surface surrounding the cooling hole foot. Thereby, locally small radii in the aperture of the cooling hole on the first surface of the cooling hole foot are mainly avoided. For example, if the cooling hole has a circular cross-section, the aperture of the cooling hole on the first surface of the cooling hole foot may have a circular or substantially circular circumference. Consequently, local stress concentrations are reduced which helps in increasing the lifetime of the blade.

The outer surface of the blade may include, for example, at least one of an outer surface of an airfoil, an outer surface of a platform connected to the airfoil, and an outer surface of a coupling structure of the blade.

The inner surface of the blade defines a cavity or hollow space within the blade. Between the inner surface and the outer surface, massive material, e.g., a metal material, is provided that forms a blade wall. The cooling holes extend through the blade wall. The cavity is configured to be in fluid communication with a source of pressurized cooling fluid. For example, the blade may include a channel opening into the cavity. A thickness of the blade wall between the inner and the outer surface may be dimensioned to withstand the local mechanical and thermal loads. Generally, the inner surface may be a curved surface or, at least, may include curved surface regions.

The cooling hole foot, which is also referred to only as “foot” in the following, is a local, discrete topographic element formed integrally with the inner surface. Hence, a region of the inner surface surrounding the foot may be flat or curved and is named herein as base surface region. The foot includes a first foot surface, which may, for example, be flat or planar, and extends inclined relative to the base surface region.

The cooling hole provides a fluid connection between the cavity and the outer surface of the blade. The cooling hole extends between the first foot surface and the outer surface of the blade. Hence, the cooling hole forms an inner aperture on the first foot surface and an outer aperture on the outer surface of the blade. A central axis of the cooling hole extends inclined relative to the base surface region of the inner surface and transverse to the first foot surface. Therefore, mechanical stress on the inner surface of the blade in the region of the inner aperture is reduced since a glancing intersection between the cooling hole and the inner surface is avoided.

Further embodiments of the present disclosure are subject of the further subclaims and the following description, referring to the drawings.

According to some embodiments, the first foot surface may be flat or planar. "Even" or "planar" or "flat", in this context, is not limited to perfectly even surfaces but may also include surfaces having a small curvature, e.g. with a radius of curvature greater than 0.05 m, preferably greater than 0.1 m, and particularly preferable greater than 0.5 m. A flat or essentially flat surface provides the benefit, that occurrence of local small radii in the aperture formed by the cooling hole in the first foot surface can be further prevented.

According to some embodiments, the cooling hole foot is formed as a projection or boss protruding from the base surface region of the inner surface. For example, the first foot surface may form a ramp emerging from the base surface region. By providing the foot as a projection, i.e., by adding material or land on the inner surface of the blade, weakening of the wall thickness is avoided.

According to some embodiments, the cooling hole foot may include a curved second foot surface emerging from the base surface region and extending inclined to the first foot surface. The second foot surface and the first foot surface may face away from each other and, together, may form a substantially wedge-shaped element or a dormer. An intersecting edge between the first and the second foot surface may be oriented along a radial or span direction of the blade, i.e., transverse to an axis of rotation of the rotor disk, which is typically a direction along which high loads occur due to centrifugal forces. Thereby, the influence of the foot on a flux of forces within the blade is advantageously reduced.

According to some embodiments, a first intersecting line between the first foot surface and the base surface region may be a straight line. This straight line, optionally, may extend along the radial direction of the blade. Thereby, the influence of the foot on a flux of forces within the blade is advantageously reduced further.

According to some embodiments, a second intersecting line between the second foot surface and the base surface region may be a curved, i.e., arc shaped line.

According to some embodiments, the second foot surface has a convex curved main portion and a transition portion connecting the main portion and the base surface region, wherein the transition portion is curved convex or concave. For example, the second foot surface may have generally the shape of a bell curve. By forming the second foot surface as a curved surface, a smooth transition between the base surface region of the inner surface and the foot is achieved which further reduces mechanical stress in the region of the foot.

According to some embodiments, an intersecting edge between the first foot surface and the second foot surface may be arc shaped. Thereby, a transition between the base surface region of the inner surface and the foot thereby is optimized in terms of reducing mechanical stress in the region of the foot.

According to some embodiments, the intersecting edge may extend along a span or radial direction of the airfoil, the span or radial direction extending from a root end towards a tip end of the blade. As mentioned above, thereby, the influence of the foot on a flux of forces within the blade is advantageously reduced.

According to some embodiments, the cooling hole may have a circular cross-section. Since the central axis of the cooling hole extends transverse to the first foot surface, the inner aperture of the cooling hole is circular or substantially circular. Thereby, locally small radii are avoided and, consequently, local stress concentrations are reduced.

According to some embodiments, the cooling hole may have diameter within a range between 0.3 mm to 5 mm. According to some embodiments, the cooling hole may have diameter within a range between 0.6 mm to 1.5 mm.

According to some embodiments, a first angle between the central axis of the cooling hole and the base surface region of the inner surface may be greater than 0° and smaller or equal to 45°. According to some embodiments, the first angle may be in a range between 5° and 30°.

According to some embodiments, a second angle between the first foot surface and the central axis of the cooling hole may be within a range between 70° and 110°. In particular, the second angle may be within a range between 85° and 95°. Hence, the central axis of the cooling hole extends perpendicular or substantially perpendicular to the first foot surface. Thereby, occurrence of locally small radii at the inner aperture of the through hole can be further reduced.

According to some embodiments, the blade may include an airfoil extending along a span or radial direction between a platform end and a tip end, and along a chord direction between a leading edge and a trailing edge, wherein the airfoil has an outer surface that forms, between the leading edge and the trailing edge, a suction side surface and an opposite pressure side surface. The outer surface of the blade, hence, may be formed, at least partially, by the outer surface of the airfoil.

According to some embodiments, the blade may include a platform protruding transversely from the outer surface of the airfoil at the platform end. The platform, for example, extends along a circumferential direction and along the axial direction. The circumferential direction extends transverse to the span or radial direction and transverse to the axial direction. The platform may include an upper surface that faces towards the tip end of the airfoil, a lower surface that is oriented opposite to the upper surface, and an end face that connects the upper and the lower surface. The upper surface of the platform may be connected to the outer surface of the airfoil by a transition surface that may, optionally, have a concave curvature. The outer surface of the blade, therefore, may include the upper surface, the lower surface, and the end face of the platform, and, if provided, the transition surface.

The outer surface of the airfoil and the upper surface of the platform form a hot gas washed surface, when the blade is employed in a turbine part of the gas turbine.

According to some embodiments, the blade may include a root connected to the platform protruding from the platform along the radial direction. The root may have, for example, a firtree shaped cross section and, generally, is configured to couple the blade to the rotor disk, which may include a complementary shaped recess or groove. The outer surface of the blade may also include an outer surface of the root. Optionally, the root may include a channel that is in fluid communication with the cavity that may, for example, mainly extend within the airfoil.

According to some embodiments, the cooling hole may extend between the first foot surface and the outer surface of the airfoil. According to further embodiments, the cooling hole may extend within the platform between the inner surface and the end face of the platform facing away from the airfoil.

According to some embodiments, the blade may include a plurality of cooling holes, and multiple cooling hole foots may be formed on the inner surface. In this case, each of the cooling hole foots includes a first foot surface that extends inclined relative to a respective base surface region of the inner surface surrounding the respective cooling hole foot.

At least some of the plurality of cooling holes extend between the first foot surface of a respective cooling hole foot and the outer surface, the central axis of the respective cooling hole extending transverse to the respective first foot surface. That is, there may be provided cooling holes that extend directly between the inner surface and the outer surface of the blade. Those cooling holes may be named, for example, first cooling holes. Further, there may be provided second cooling holes each of which extending between a first foot surface of a respective foot and the outer surface. For example, at least one of the second cooling holes may extend between a first foot surface of a respective foot and the outer surface of the airfoil. Additionally, or alternatively, at least one of the second cooling holes may extend between a first foot surface of a respective foot and the end face of the platform.

According to some embodiments, the gas turbine may comprise a compressor configured to compress a working fluid, a burner receiving compressed working fluid from the compressor and configured to burn a fuel to heat the working fluid, and a turbine including the blade, wherein the turbine stage is configured to expand the working fluid causing the turbine blade assembly to rotate. Hence, the blade may form part of the turbine, for example, as a rotating blade or a stationary vane. As a working fluid, the compressor may suck air from the environment, and the compressed air may be used for combustion of the fuel in the combustor or burner. As a fuel, liquid fuel, such as kerosene, diesel, ethanol, or similar may be used. Alternatively, gaseous fuel such as natural gas, fermentation gas, hydrogen, or similar can be used.

The features and advantages described herein with respect to one aspect of the invention are also disclosed for the other aspects and vice versa.

With respect to directions and axes, in particular, with respect to directions and axes concerning the extension or expanse of physical structures, within the scope of the present invention, an extent of an axis, a direction, or a structure "along" another axis, direction, or structure includes that said axes, directions, or structures, in particular tangents which result at a particular site of the respective structure, enclose an angle which is smaller than 45 degrees, preferably smaller than 30 degrees and in particular preferable extend parallel to each other.

With respect to directions and axes, in particular with respect to directions and axes concerning the extension or expanse of physical structures, within the scope of the present invention, an extent of an axis, a direction, or a structure "crossways", "across", "cross", or "transversal" to another axis, direction, or structure includes in particular that said axes, directions, or structures, in particular tangents which result at a particular site of the respective structure, enclose an angle which is greater or equal than 45 degrees, preferably greater or equal than 60 degrees, and in particular preferable extend perpendicular to each other.

Within the scope of the present invention, the term "blade" is intended to cover both, a rotating blade and a stationary vane.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments, which are specified in the schematic figures of the drawings, in which.

In the figures like reference signs denote like elements unless stated otherwise.

DETAILED DESCRIPTION OF EXEMPLARY EMBODIMENTS

Figure 1:
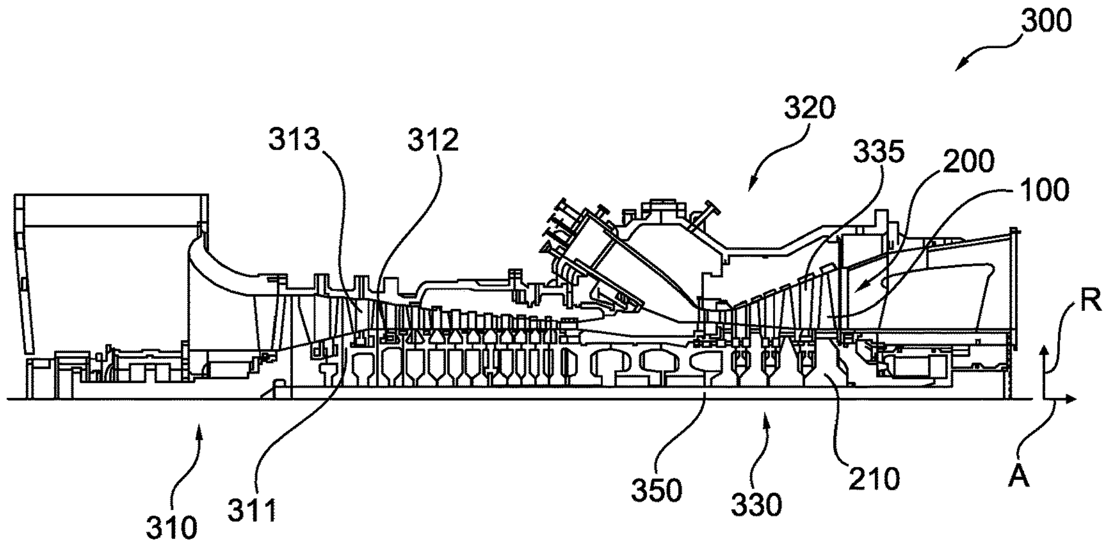
FIG. 1 schematically illustrates a cross-sectional view of a gas turbine according to an embodiment of the invention.

FIG. 1 schematically shows a gas turbine 300. The gas turbine 300 includes a compressor 310, a burner or combustor 320, and a turbine 330. The turbine 330 and the compressor 310 may include a common shaft 350 so as to be rotatable about a common rotational axis.

The compressor 310 of the gas turbine 300 may draw air as a working fluid from the environment and compress the drawn air. The compressor 310 may be realized as centrifugal compressor or an axial compressor. FIG. 1 exemplarily shows a multistage axial compressor which is configured for high mass flows of air. The axial compressor may include multiple rotor disks, each carrying a plurality of blades. The rotor disks 311 are mounted on the shaft 350 and rotate with the shaft about the rotational axis. Compressor vanes 313 are arranged downstream of the blades 312. The blades 312 compress the introduced air and deliver the compressed air to the compressor vanes 313 disposed adjacently downstream. The plurality of compressor vanes 313 guide the compressed air flowing from compressor blades 312 disposed upstream to compressor blades 312 disposed at a following, downstream stage. The air is compressed gradually to a high pressure while passing through the stages of compressor blades 312 and vanes 313.

The compressed air is supplied to the combustor 320 for combustion of a fuel, such as natural gas, hydrogen, diesel, ethanol or similar. Further, a part of the compressed air is supplied as a gaseous cooling fluid to high-temperature regions of the gas turbine 300 for cooling purposes. The burner or combustor 320, by use of the compressed air, burns fuel to heat the compressed air.

Figure 2:
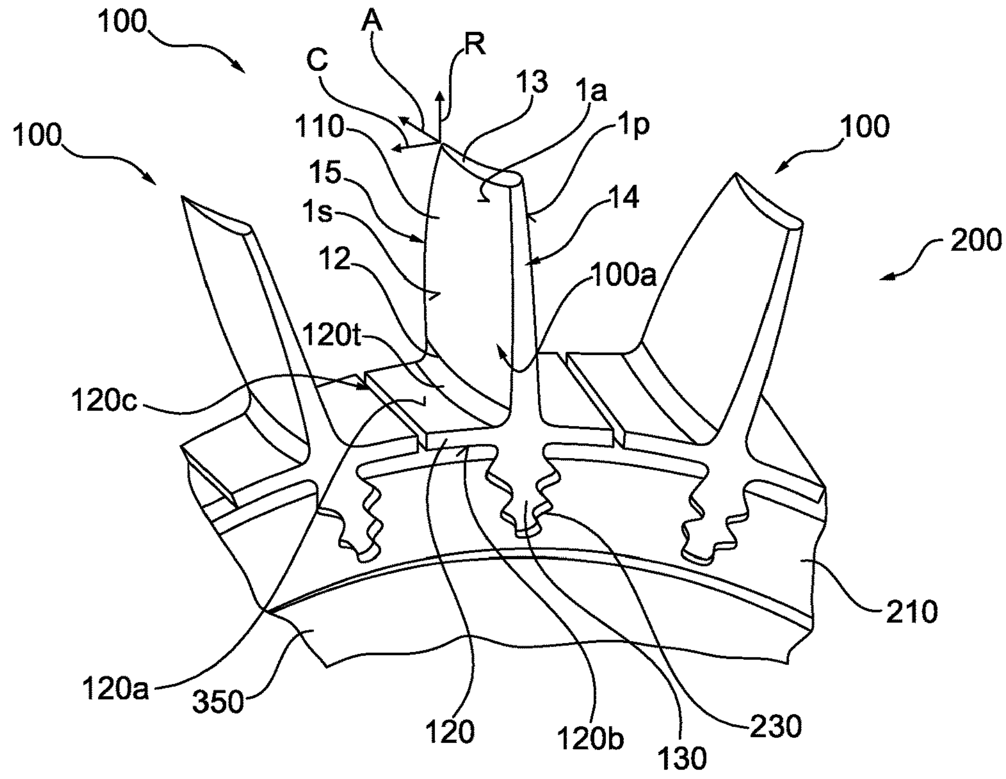
FIG. 2 shows a perspective, partial view of a blade assembly according to an embodiment of the invention.

The turbine 330 includes a plurality of blade assemblies 200, each comprising a rotor disk 210 to which a plurality of turbine blades 100 are coupled. The turbine 330 further includes a plurality of turbine vanes 335. FIG. 2 shows a partial view of a blade assembly which will be explained in more detail below. Generally, each rotor disk 210 is coupled to the shaft 350 to be rotatable with the shaft about the rotational axis. The turbine blades 100 are coupled to the respective rotor disk 210 and extend radially therefrom. The turbine vanes 335 are upstream of the blades 100 of the respective rotor disks 210. The turbine vanes are fixed so that they do not rotate about the rotational axis of the shaft 350 and guide the flow of combustion gas coming from the burner 320 passing through the turbine blades 100. The combustion gas is expanded in the turbine 330 and the turbine blades generate rotational force while being rotated by the combustion gas. The compressor 310 may be driven by a portion of the power output from the turbine 330 via the shaft 350.

FIG. 2 shows a blade assembly 200 of the turbine 330. As explained above, the blade assembly includes a rotor disk 210 and a plurality of blades 100.

The rotor disk 210, generally, may have the form of a ring and, at its outer circumference, includes multiple coupling interfaces 230 for coupling the blades 100 to the disk 210. As exemplarily shown in FIG. 2, the coupling interfaces 230 may be formed by grooves. As an example, FIG. 2 shows grooves that have a cross-sectional shape similar to a firtree.

Figure 3:
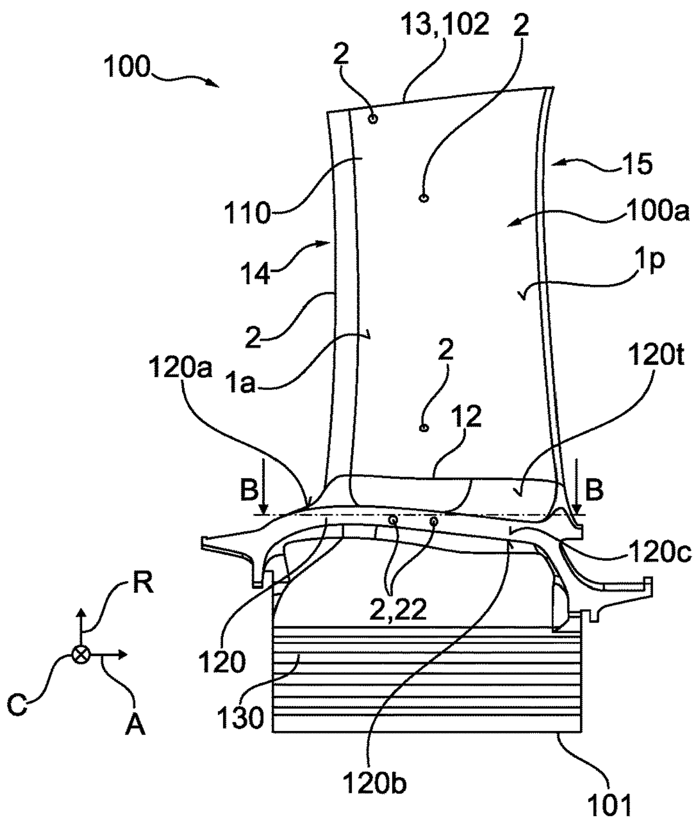
FIG. 3 shows a side view of a turbine blade according to an embodiment of the invention.

As shown in FIG. 2, the blade assembly 200 includes multiple blades 100. FIG. 3 exemplarily shows a blade 100 in a side view. As shown in FIGS. 2 and 3, each blade 100 may include an airfoil 110, a platform 120, and a root 130.

The airfoil 110 may extend along radial or span direction R between a platform end 12 and a tip end 13. With regard to an axial or chord direction, that extends transverse to the radial direction, the airfoil 110 may extend between a leading edge 14 and a trailing end 15. An outer surface 1*a* of the airfoil 110, between the leading edge 14 and the trailing edge 15, may define a pressure side surface 1*p* and a suction side surface 1*s* being oriented opposite to the pressure side surface 1*p*.

As schematically shown in FIG. 2, the platform 120 may be a substantially plate shaped structure having an expanse with respect to the axial direction A and with respect to a circumferential direction C that extends transverse to the axial direction A and to the radial direction R. The platform 120 is coupled to the platform end 12 of the airfoil 110 and may protrude from the airfoil 110 with respect to the circumferential direction C. As depicted by way of example in FIG. 2, the platform 120 may include an upper surface 120*a* oriented towards the tip end 13 of the airfoil 110 and a lower surface 120*b* oriented opposite to the upper surface 120*a*. Further, the platform 120 may have an end face 120*c* connecting the upper and lower surfaces 120*a*, 120*b* and being oriented in the circumferential direction C.

The outer surface 1*a* of the airfoil 110, in particular, the pressure side surface 1*p* and the suction side surface 1*s*, each may be connected to the upper surface 120*a* of the platform 120 via a transition surface 120*t*. As exemplarily shown in FIG. 2, the transition surface 120*t* may be a concave curved surface.

The root 130 is connected to the lower surface 120*b* of the platform 120 and protrudes from the lower surface 120*b* of the platform 120 along the radial direction R. As exemplarily shown in FIG. 2, the root 130 may include a firtree shaped cross-section. Generally, the coupling interfaces 230 of the rotor disk 210 and the roots 130 of the blades 100 may have complementary cross-sections. As shown in FIG. 2, the roots 130 and the coupling interfaces 230 are interconnected, i.e., they are engaged and interlocked with each other.

Hence, generally, the blade 100 extends in the radial direction R between a root end 101, e.g., an end of the root 130 facing away from the airfoil 110, and a tip end 102, e.g., being the tip end 13 of the airfoil 110. An outer surface 100*a* of the blade 100 is formed by the outer surface 1*a* of the airfoil 110, the transition surface 120*t*, the upper and lower surfaces 120*a*, 120*b* and the end face 120*c* of the platform 120, and an outer surface of the root 130.

Figure 4:
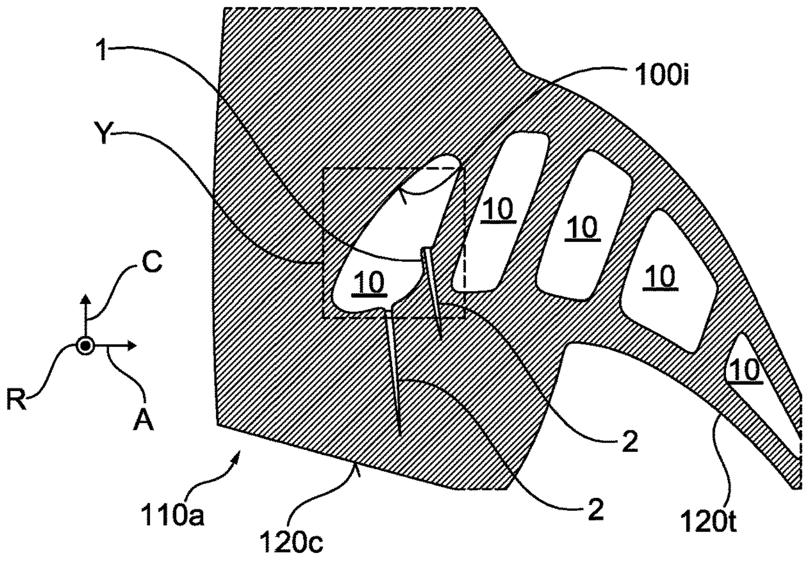
FIG. 4 shows a schematic cross-sectional view of the blade of FIG. 3 taken along line B-B in FIG. 3.

FIG. 4 shows a sectional view of the blade 100 shown in FIG. 3. As visible from FIG. 4, the blade 100 includes an inner surface 100*i* that defines a cavity 10. As shown exemplarily in FIG. 4, the blade 100 may include multiple cavities 10, each being limited or defined by an inner surface 100*i* of the blade 100. In the following, it is only referred to one single cavity 10 to avoid unnecessary repetitions. Generally, one or more cavities may be provided and at least one of the cavities may be configured as described below.

As visible from FIG. 4, the cavity 10 may extend along the radial direction R. For example, the cavity 10 may extend within at least one of the airfoil 110, the platform 120, and the root 130 with respect to the radial direction R. The inner surface 100*i* defining the cavity 10 may be curved or, at least, may have curved regions such as concave curved regions as exemplarily shown in FIG. 4. The cavity 10 is configured to receive a gaseous cooling fluid, e.g., compressed air supplied by the compressor 310.

As shown in FIG. 3 a plurality of cooling holes 2 are formed in the blade 100. The cooling holes 2 connect the one or more cavities 10 to the outer surface 100*a* of the blade 100 so that cooling fluid can be discharged from the respective cavity 10 through the cooling holes 2 on the outer surface 100*a* of the blade 100. Each cooling hole 2 forms an outer aperture 22 on the outer surface 100*a* of the blade 2 where the cooling fluid is discharged from the cooling hole 2. As shown in FIG. 3 by way of example only, cooling holes may be positioned at various locations on the outer surface 100*a*, e.g., in the outer surface 1*a* of the airfoil 110 such as in the leading edge 14, in the trailing edge 15, adjacent to the tip end 13, and within the pressure side surface 1*p* and the suction side surface (not visible in FIG. 3). Cooling hole 2 may also be provided in the platform 120, e.g., in the end face 120*c* as exemplarily shown in FIG. 3.

The cooling holes 2 may have a circular cross-section. A diameter 24 of the cooling holes 2 may lie within a range between 0.3 mm to 5 mm, in particular, within a range between 0.6 mm to 1.5 mm.

Figure 5:
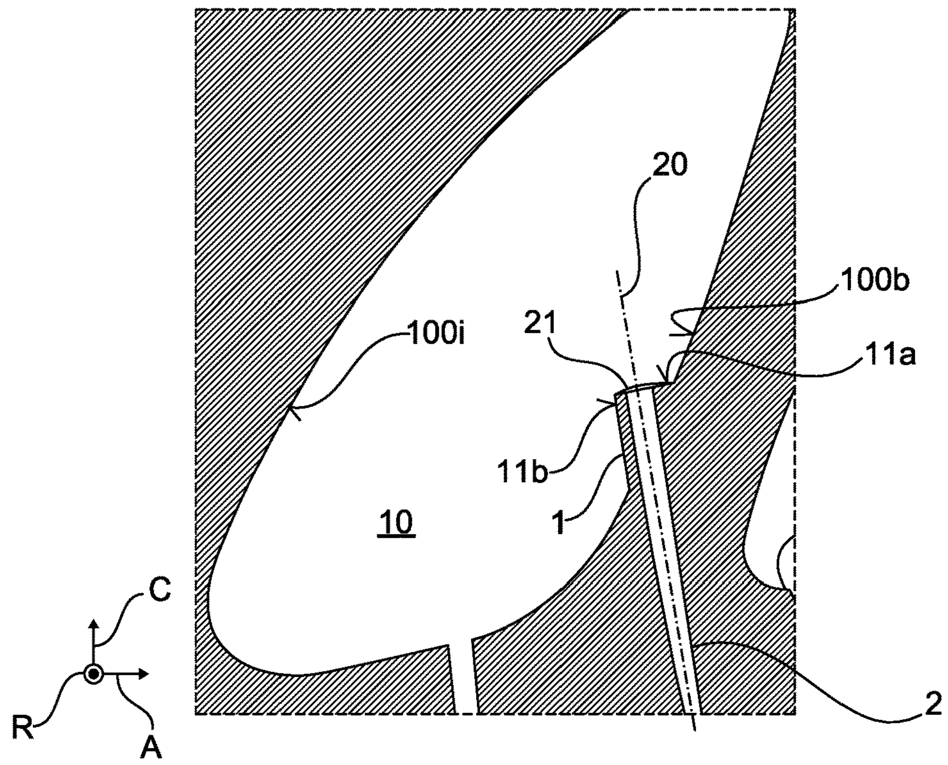
FIG. 5 shows a detailed view of the area marked by letter Y in FIG. 4.

As shown in FIG. 4 and with more details in FIG. 5, the central axis 20 of at least one of the cooling holes 2 extends inclined relative to the inner surface 100*i*. In this case, an inner aperture 21 of the hole 2 formed on the inner surface 100*i* would have an oval or elliptic circumference, when the hole 2 has a circular cross section. Depending on the angle between the inner surface 100*i* and the central axis 20, the circumference of the inner aperture 21 would include locally small radii. As a consequence peak stresses may develop in the region around the inner aperture.

Figure 6:
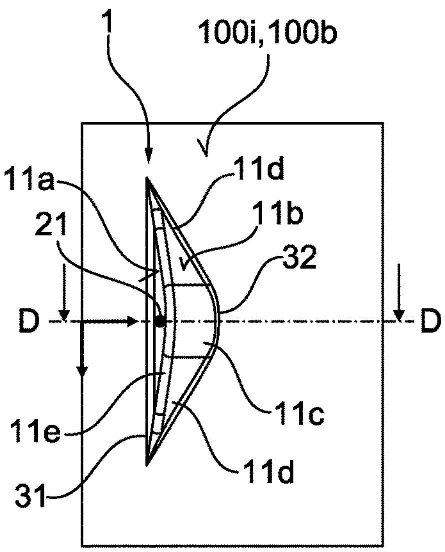
FIG. 6 shows top view to a cooling hole foot formed on an inner surface of a blade according to an embodiment of the invention.
Figure 7:
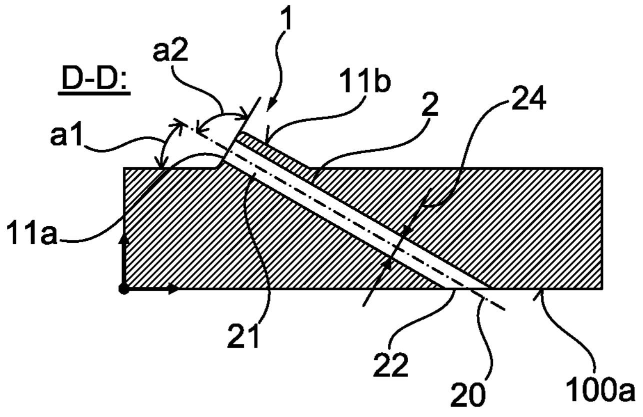
FIG. 7 shows a schematic cross-sectional view of the blade of FIG. 6 taken along line D-D in FIG. 6.

To reduce the peak stresses or, in other words, the so called notch effect in the inner surface 100*i* in the region of inclined cooling holes 2, a cooling hole foot 1 is formed on the inner surface 100*i* as shown in FIG. 4 and with more details in FIGS. 5 to 7.

As schematically shown in FIGS. 4 to 8, the cooling hole foot 1, for example, may be formed as a projection or boss protruding from the inner surface 100*i*. Generally, the cooling hole foot 1 includes a first foot surface 11*a* and second foot surface 11*b*. The first foot surface 11*a* may be formed flat or planar and extends inclined relative to a base surface region 100*b* of the inner surface 100*i* that surrounds the cooling hole foot 1. The second foot surface 11*b* extends inclined relative to the first foot surface 11*a*. As exemplarily shown in FIG. 6, the second foot surface 11*a*, optionally, may extend curved emerging from the base surface region 100*b*. For example, the second foot surface 11*b* may have a convex curved main portion 11*c* and a transition portion 11*d* connecting the main portion 11*c* and the base surface region 100*b*, wherein the transition portion 11*d* is curved convex or concave, as schematically shown in FIG. 6. Irrespective of the shape of the second foot surface 11*b*, as exemplarily shown in FIG. 6, an intersection line 31 between the first foot surface 11*a* and the base surface region 100*b* of the inner surface 100*i* may be a straight or substantially straight line. As further shown in FIG. 6, an intersection line 32 between the second foot surface 11*b* and the base surface region 100*b* of the inner surface 100*i* may be a curve, e.g., arc shaped line. An intersecting edge 11*e* between the first foot surface 11*a* and the second foot surface 11*b*, optionally, may be arc shaped as exemplarily shown in FIG. 6. This configuration of the cooling hole foot 1 is advantageous in terms of force flux, i.e., it helps in conducting forces acting along the inner surface 100*i* in a smooth fashion to reduce local stress concentrations. Optionally, the intersecting edge 11*e* between the first and second foot surfaces 11*a*, 11*b* and or the intersecting line between the first foot surface 11*a* and the base surface 100*i* may extends along the radial direction R of the blade 100.

Figure 8:
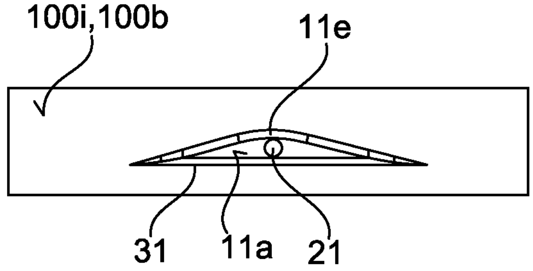
FIG. 8 shows a top view to a first foot surface of the cooling hole foot shown in FIG. 6 in a view direction parallel to a central axis of a cooling hole formed in the first foot surface.

The cooling hole 2, which central axis 20 extends inclined relative to the base surface region 100*b* of the inner surface 100*i*, is formed so as to extend between the first foot surface 11*a* of the cooling hole foot 1 and the outer surface 100*a* of the blade 100. A first angle a1 between the central axis 20 of the cooling hole 2 and the base surface region 100*b* of the inner surface 100*i* is greater than 0° and smaller or equal to 45°. For example, the first angle a1 may be in a range between 5° and 30°. As visible best in FIGS. 5 and 7, the central axis 20 of the cooling hole 2 extends transverse to the first foot surface 11*a*. For example, a second angle a2 between the first foot surface 11*a* and the central axis 20 of the cooling hole 2 may lie within a range between 70° and 110°, in particular, between 85° and 95°. Due to the inclined orientation of the first foot surface 11*a* to the inner surface 100*i* and the substantially perpendicular extension of the central axis 20 of the cooling hole 2 to the first foot surface 11*a*, the cooling hole 2 can extend inclined to the inner surface 100*i* but small local radii are avoided. In the case of a cooling hole 2 with a circular cross-section, the inner aperture 21 has a circular or substantially circular circumference, as visible best in FIG. 8 showing a view in a direction parallel to the central axis 20 of the cooling hole. An angle between the base surface region 100*b* of the inner surface 100*i* and the first foot surface 11*a* may, for example, lie within a range between 95° and 140°.

In the example of FIGS. 4 and 5, only one of the shown cooling holes 2 extends from the cooling hole foot 1. However, it should be understood that multiple cooling hole foots 11 can be provided on the inner surface 100*i* defining the cavity 10. Where the blade 100 includes a plurality of cooling holes 2 in fluid communication with one cavity 10, multiple cooling hole foots 11 may be formed on the inner surface 100*i*. Each of the cooling hole foots 11 may be formed as described above. At least some of the plurality of cooling holes 2, in this case, may extend between the first foot surface 11*a* of a respective one of the plurality of cooling hole foots 11 and the outer surface 100*a* of the blade. Those cooling holes 2 that extend from the cooling hole foots 11 each have a central axis 20 that extends transverse to the respective first foot surface 11*a* and inclined to the base surface region 100*b* surrounding the respective cooling hole foot 1.

FIGS. 3 to 5, by way of example only show a cooling hole 2 that extends within the platform 120 between the inner surface 100*i* and the end face 120*a* of the platform 120. However, the invention is not limited to this case. For example, the cooling hole 2 may also extend between the first foot surface 11*a* and the outer surface 1*a* of the airfoil 110 or the outer surface of the root 130. Generally, the cooling hole 2 extends between the first foot surface 11*a* of the cooling hole foot 1 and the outer surface 100*a* of the blade 100.

Although the present invention has been explained above in connection with a blade 100 rotating with a rotor disk 210, it is not limited to this configuration. The "blade" including the cooling foot and the cooling hole extending from the cooling foot to the outer surface may also be a stationary vane.

Although specific embodiments have been illustrated and described herein, it will be appreciated by those of at least ordinary skill in the art that a variety of alternate and/or equivalent implementations exist. It should be appreciated that the exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

What is claimed is:

1. A blade for a gas turbine, comprising:

a blade wall having an outer surface and an inner surface that defines a cavity for receiving a gaseous cooling fluid, the blade wall having a first thickness between the outer surface and the inner surface;

a cooling hole foot formed on the inner surface, the cooling hole foot including a first foot surface that extends inclined relative to a base surface region of the inner surface surrounding the cooling hole foot, wherein the blade wall has a second thickness between the outer surface and the inner surface about the cooling hole foot is greater than the first thickness; and a cooling hole extending between the first foot surface of the cooling hole foot and the outer surface to discharge cooling fluid from the cavity to the outer surface, a central axis of the cooling hole extending transverse to the first foot surface, wherein the cooling hole has a circular cross-section, and wherein an inner aperture of the cooling hole formed on the inner surface has an oval or elliptic circumference; and wherein the cooling hole has a constant diameter from the inner aperture to the outer surface.

2. The blade of claim 1, wherein the cooling hole foot is formed as a projection protruding from the base surface region of the inner surface.

3. The blade of claim 2, wherein the cooling hole foot includes a curved second foot surface emerging from the base surface region and extending inclined to the first foot surface.

4. The blade of claim 3, wherein the second foot surface has a convex curved main portion and a transition portion connecting the main portion and the base surface region, wherein the transition portion is curved convex or concave.

5. The blade of claim 3, wherein an intersecting edge between the first foot surface and the second foot surface is arc shaped.

6. The blade of claim 5, wherein the intersecting edge extends along a radial direction of the blade, the radial direction extending from a root end towards a tip end of the blade.

7. The blade of claim 1, wherein the first foot surface is flat or planar.

8. The blade of claim 1, wherein the cooling hole has a diameter within a range between 0.3 mm to 5 mm.

9. The blade of claim 8, wherein the diameter of the cooling hole is within a range between 0.6 mm to 1.5 mm.

10. The blade of claim 1, wherein a first angle between the central axis of the cooling hole and the base surface region of the inner surface is greater than 0 degrees and smaller or equal to 45 degrees.

11. The blade of claim 10, wherein the first angle is in a range between 5 degrees and 30 degrees.

12. The blade of claim 10, wherein a second angle between the first foot surface and the central axis of the cooling hole is within a range between 70 degrees and 110 degrees.

13. The blade of claim 12, wherein the second angle is within a range between 85 degrees and 95 degrees.

14. The blade of claim 1 further comprising:

an airfoil extending along a span or radial direction between a platform end and a tip end, and along a chord or axial direction between a leading edge and a trailing edge, and wherein the airfoil has an outer surface that forms, between the leading edge and the trailing edge, a suction side surface and an opposite pressure side surface;

a platform protruding transversely from the outer surface of the airfoil at the platform end; and a root connected to the platform and protruding from the platform along the radial direction, wherein the cooling hole extends between the first foot surface and the outer surface of the airfoil, or the cooling hole extends within the platform between the inner surface and an end face of the platform facing away from the airfoil.

15. The blade of claim 1, wherein the blade includes a plurality of cooling holes, and wherein multiple cooling hole foots are formed on the inner surface, each of the cooling hole foots including a first foot surface that extends inclined relative to a respective base surface region of the inner surface surrounding the respective cooling hole foot, wherein at least some of the plurality of cooling holes extend between the first foot surface of a respective cooling hole foot and the outer surface, the central axis of the respective cooling hole extending transverse to the respective first foot surface.

16. A turbine blade assembly, comprising:

a rotor disk; and a plurality of the blades of claim 1 coupled to the rotor disk, each of the plurality of blades being coupled to the rotor disk.

17. A gas turbine comprising a turbine blade according to claim 1.

* * * * *